United States Patent
Nichols

(10) Patent No.: US 7,438,302 B2
(45) Date of Patent: Oct. 21, 2008

(54) SCOOTER AND EVENT FORUM SEAT

(75) Inventor: Steven L. Nichols, 740 E. 250 North, Heber, UT (US) 84032

(73) Assignee: Steven L. Nichols, Heber City, UT (US)

( * ) Notice: Subject to any disclaimer, the term of this patent is extended or adjusted under 35 U.S.C. 154(b) by 443 days.

(21) Appl. No.: 11/369,146

(22) Filed: Mar. 6, 2006

(65) Prior Publication Data

US 2007/0205570 A1    Sep. 6, 2007

(51) Int. Cl.
 *B62M 1/00* (2006.01)
(52) U.S. Cl. ............................ 280/87.041; 280/87.05; 280/639; 297/252; 297/352
(58) Field of Classification Search .............. 297/352, 297/252, 129, 230.1, 230.13; 280/638, 639, 280/87.041, 87.05
See application file for complete search history.

(56) References Cited

U.S. PATENT DOCUMENTS

| | | | | |
|---|---|---|---|---|
| 1,293,778 A * | 2/1919 | Holm | .......................... | 297/252 |
| 2,480,402 A * | 8/1949 | Elston | .......................... | 297/129 |
| 3,314,494 A * | 4/1967 | Weitzner | .................... | 180/208 |
| 4,925,245 A * | 5/1990 | Pendleton et al. | ........ | 297/440.1 |
| 5,186,479 A | 2/1993 | Flowers | | |
| 5,299,826 A | 4/1994 | Flowers | | |
| 5,829,837 A * | 11/1998 | Reiersen | ..................... | 297/352 |
| 6,079,599 A * | 6/2000 | Nordstrom et al. | .......... | 224/153 |
| 6,332,565 B1 * | 12/2001 | Tsai | .......................... | 224/257 |
| 6,789,809 B2 * | 9/2004 | Lin | .......................... | 280/47.25 |
| 7,108,321 B2 * | 9/2006 | Davis | .......................... | 297/252 |
| 7,128,369 B2 * | 10/2006 | Boggs et al. | ........... | 297/188.08 |

* cited by examiner

*Primary Examiner*—Christopher Ellis
*Assistant Examiner*—John D Walters
(74) *Attorney, Agent, or Firm*—Steven L. Nichols

(57) ABSTRACT

A wheeled scooter is integrated with an event forum seat. The apparatus is configured to convert between a first configuration in which the apparatus is operable as a scooter for transportation and a second configuration in which the apparatus is operable as an event forum seat.

20 Claims, 3 Drawing Sheets

US 7,438,302 B2

SCOOTER AND EVENT FORUM SEAT

BACKGROUND

Attending sporting and other events in a stadium or other forum is an important recreational activity for many people. Frequently, such an event takes up a large block of time including travel to and from the venue, parking, eating, and/or tail-gating in addition to attending the sporting or other event.

Because of the large number of people attending such events, traffic and parking are frequently a problem for attendees. For example, someone attending such an event may have to decide between going very early to obtain parking near the venue or going later, closer to the starting time of the event, and parking farther away from the venue. In many cases, an event attendee may end up walking a significant distance from a parking place to the event venue.

Additionally, the seating in many sports arenas, stadiums and other venues is frequently bench seating to accommodate the large number of attendees. While providing a large occupant capacity, bench seating can also be uncomfortable, particularly over the extended time periods that sporting events and other large-arena events may last. Bench seating typically lacks any back support or cushioning to increase attendee comfort.

For these reasons, event attendees with tickets for bench seating frequently bring with them a portable seat that will rest on, and may be attached to, a bench seat. These portable seats may provide both a seat back and a seat cushion to enhance the comfort of the event attendee.

SUMMARY

A wheeled scooter is integrated with an event forum seat. The apparatus is configured to convert between a first configuration in which the apparatus is operable as a scooter for transportation and a second configuration in which the apparatus is operable as an event forum seat.

BRIEF DESCRIPTION OF THE DRAWINGS

The accompanying drawings illustrate various embodiments of the present invention and are a part of the specification. The illustrated embodiments are merely examples of the present invention and do not limit the scope of the claims.

Throughout the drawings, identical reference numbers designate similar, but not necessarily identical, elements.

DETAILED DESCRIPTION

The present specification describes a wheeled scooter that is integrated with an event forum seat. The apparatus or device is configured to convert between a first configuration in which the apparatus is operable as a scooter for transportation and a second configuration in which the apparatus is operable as an event forum seat.

As used herein and in the appended claims, the term "event forum" is used to refer broadly to any forum in which an event is held such as a sporting event, musical concert, or other event. Consequently, the term "event forum" includes, but is not limited to a stadium, an arena, a coliseum, a theater or amphitheatre, a hall, an event center, and other locations where events can be held.

As used herein and in the appended claims, the term "event forum seat" will refer broadly to a portable seat that can be taken to an event forum, such as a stadium, and used as a more comfortable seat on the seating of the forum, for example, bench seating. The term "event forum seat" thus refers to a portable seat and should not be confused with seating that is already and permanently installed at the event forum.

The term "scooter" will refer broadly to a wheeled platform or carriage that can be propelled by a rider. The scooter may be pushed with one foot of a rider while the rider stands with his or her other foot on the scooter.

Figure 1:
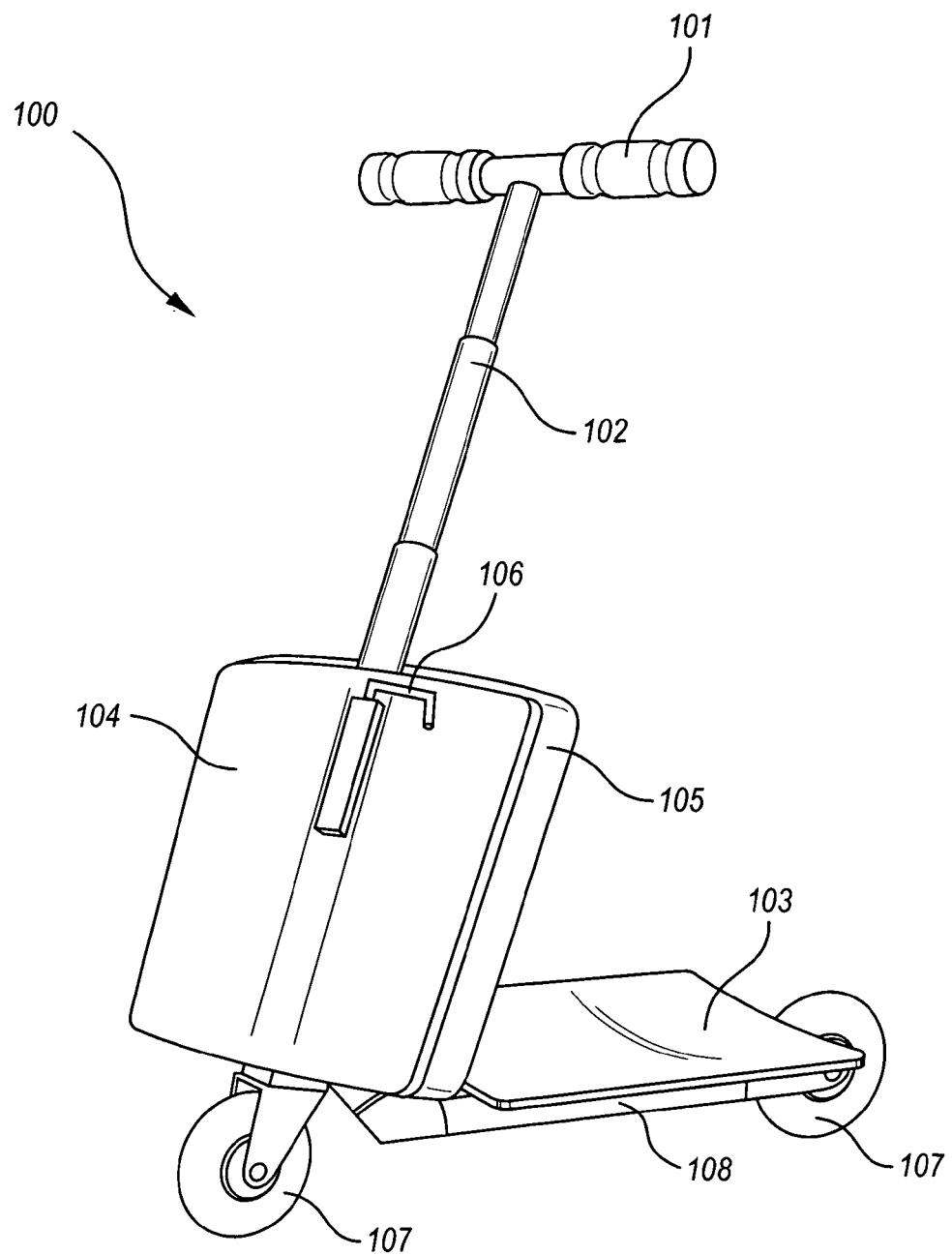
FIG. 1 illustrates an integrated scooter and event forum seat in a scooter configuration according to principles described herein.

FIG. 1 illustrates an integrated scooter and event forum seat device (100) according to principles described herein. As shown in FIG. 1, the device (100) is in a scooter configuration and can be used as a scooter as described herein.

The integrated scooter and event forum seat device (100) includes a backrest/platform member (103) that functions as a scooter platform when the device (100) is in a scooter configuration and a backrest when the device (100) is in a seat configuration. The seat configuration of the device (100) will be explained in more detail below in connection with FIG. 2.

As indicated, FIG. 1 illustrates an integrated scooter and event forum seat device (100) in a scooter configuration. Consequently, the device (100) will be referred to as alternately as either a scooter or the "device" with respect to FIG. 1.

As illustrated in FIG. 1, the backrest/platform member (103) serves as a platform on which a scooter rider can stand when the device (100) is in the scooter configuration of FIG. 1. The rider can stand with both feet on the platform (103) while the scooter is coasting, or can stand with one foot on the platform (103) while using his or her other foot to push the scooter (100). Thus, the term "platform" as used herein and in the appended claims refers to that portion of a scooter on which the scooter ride stands.

The platform (103) is supported on a wheeled carriage (108). In the example of FIG. 1, the wheeled carriage (108) includes two wheels (107) disposed along the line of the platform (103). However, as will be appreciated by those skilled in the art, different numbers of wheels and different wheel configurations could be used in examples of the device described herein.

Extending from the wheeled carriage (108) is a seat member (104). As will be explained below, the seat member (104) is actually used as a seat when the scooter (100) is changed into a seat configuration. The seat member (104) may include a seat cushion (105) and a hook (106), which will be described in more detail below.

A telescoping steering column (102) also extends from the wheeled carriage (108) and the seat member (104). A handle (101) is attached to the column (102). In the illustrated example, the handle (101) forms a T-shape with the steering column (102) and is used to steer the scooter (100). By turning the handle (101) right or left, the scooter rider can also turn the front wheel (107) of the scooter (100) right or left so as to steer the scooter (100).

Figure 2:
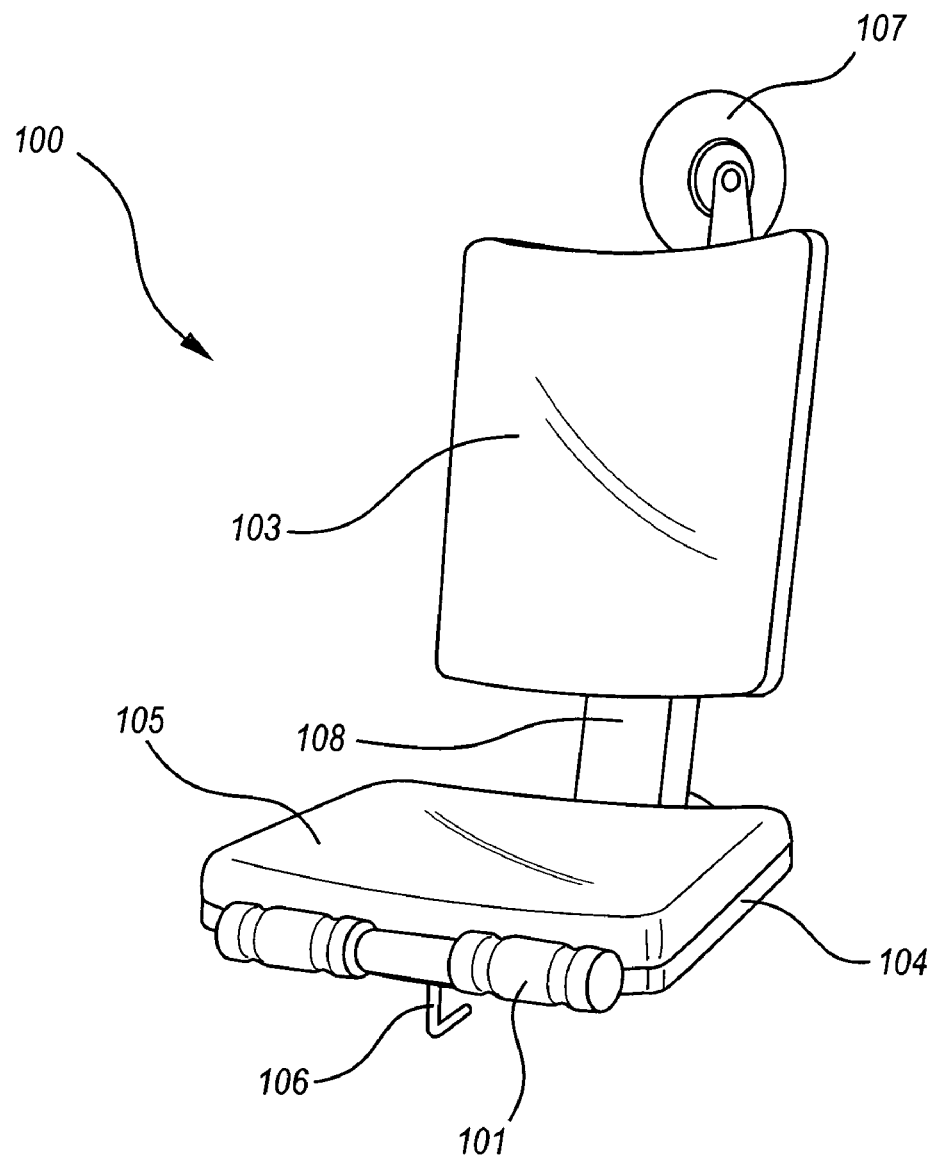
FIG. 2 illustrates an integrated scooter and event forum seat in a seat configuration according to principles described herein.

FIG. 2 illustrates an integrated scooter and event forum seat in a seat configuration according to principles described herein. As shown in FIG. 2, the device (100) being described has been re-configured for use as an event forum seat. Consequently, the device (100) will be referred to as either an event forum seat, seat device or the "device" in connection with FIG. 2.

As shown in FIG. 2, the telescopic steering column (102, FIG. 1) has been collapsed into the seat member (104) of the event forum seat (100). The handle (101) is thus brought to a position at, near or against an edge of the seat member (104). When the event forum seat (100) is in use, the handle (101) will be located behind the knees of a user sitting on the seat (105). Pliant foam may be disposed on some or all of the handle (101) so that the handle (101) is comfortable to grip when being used for steering as described above in connection with FIG. 1 or when resting behind the knees of a seated user as described here in connection with FIG. 2.

The backrest/platform member (103), which served as a platform in the scooter configuration described above, now serves as a backrest (103) when the device (100) is placed in the seat configuration. Thus, a user who has ridden the scooter to the event forum can place the seat member (104) on the bench or other seating of the event forum. The user then sits on the seat member (104), with or without a seat cushion (105), and rests his or her back against the backrest (103).

The hook (106) may be hooked around the front edge of the bench or other seating on which the seat device (100) is placed. This prevents the seat device (100) from moving backwards with respect to the bench or other seating on which the seat device (100) rests. Otherwise, the seat device (100) may tend to scoot backwards and fall off the back of the bench seating on which it rests.

The hook may be biased with a spring or other means so as to lay flat against the seat member (104) when not in use, as shown in FIG. 1. The hook (106) can then be moved against the bias to an open position, as shown in FIG. 2. In the open position, the hook (106) can engage the front edge of event forum seating on which the seat device (100) is placed.

Figure 3:
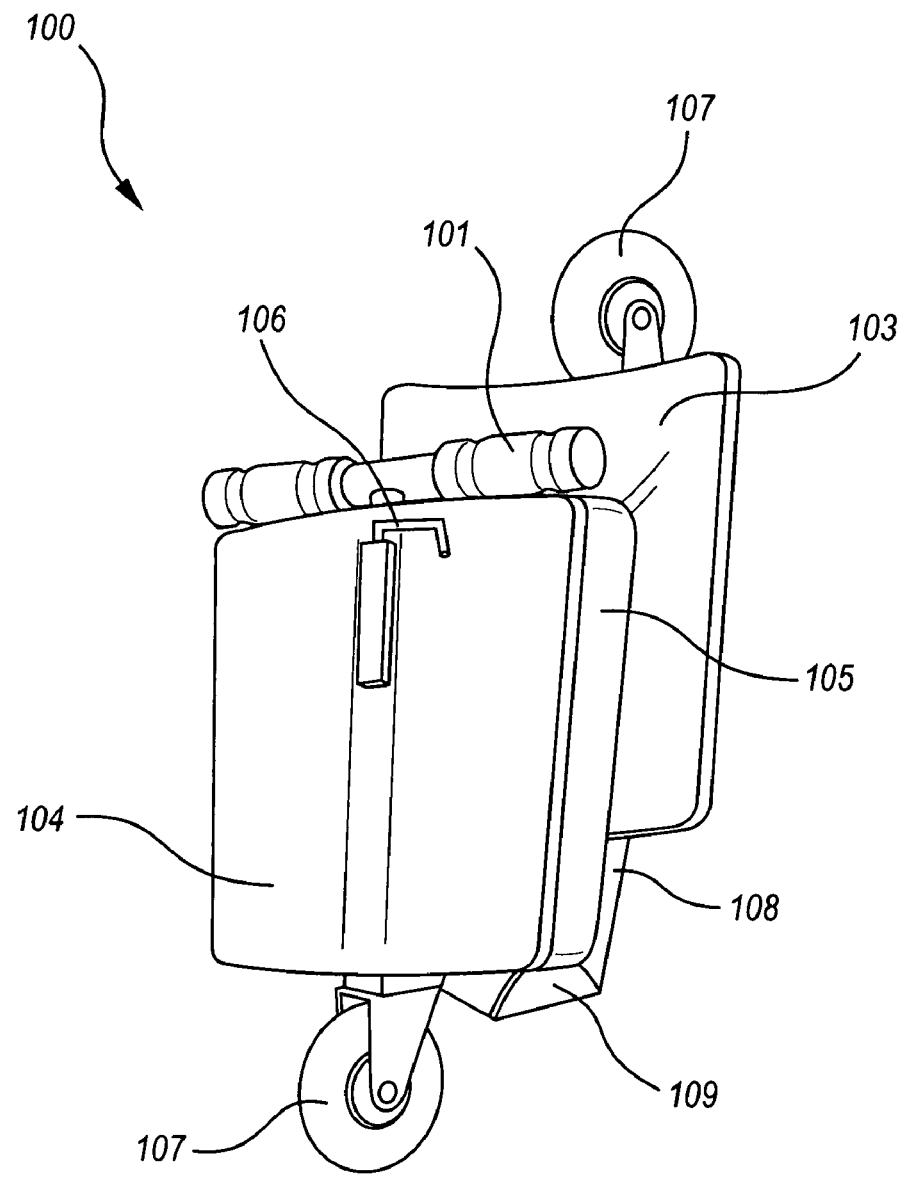
FIG. 3 illustrates an integrated scooter and event forum seat in a storage configuration according to principles described herein.

FIG. 3 illustrates an integrated scooter and event forum seat in a storage configuration according to principles described herein. As shown in FIG. 3, the wheeled carriage (108) may include a joint (109) that allows the seat member (104) to be folded against the platform/backrest member (103). The telescopic steering column (102, FIG. 1) can also be collapsed into the seat member (104) as described above. This places the device (100) in a compact storage configuration that is shown in FIG. 3. In this configuration, the device (100) can be readily stored or transported to an event forum where it will be used.

Thus, in one example, the device (100) being described herein can be used as follows. When an event attendee, hereinafter referred to as the device "user," arrives at parking for a sporting or other event, the user places the device (100) in the scooter configuration of FIG. 1. This may include extending the telescopic steering column (102, FIG. 1) and folding the seat member (104) away from the platform/backrest (103). In other words, the device (100) is changed from the configuration of FIG. 3 or some other configuration to the configuration of FIG. 1. It should be noted that the device (100) need not necessarily be in the storage configuration of FIG. 3 when arriving at, or being transported to, the event forum.

After parking and placing the device (100) in the scooter configuration, the user rides the scooter from his or her parked car to the event forum. The device (100) may then be returned to the storage configuration of FIG. 3 while the user locates his or her seat in the event forum.

Once the user has arrived at his or her seat, the device (100) is placed in the seat configuration of FIG. 2. This may include folding the seat member (104) away from the platform/backrest member (103) and extending the hook (106) to engage the bench or other seating of the event forum. The seat (100, FIG. 2) is then placed at the appropriate location on the seating of the event forum. The user then uses the seat (100, FIG. 2) as a more comfortable seat from which to watch the event than would be provided by the forum's bench or other seating on which the seat device (100) now rests.

When the event concludes, the device (100) can be placed in the storage configuration of FIG. 3 for removal from the event forum. Once outside, the user places the device (100) in the scooter configuration of FIG. 1 and uses the scooter to return quickly to his or her parked vehicle. The device (100) can then be returned to the storage configuration of FIG. 3 or some other configuration and stowed in the user's vehicle.

Consequently, the device described herein provides a convenient means for the attendee of an event to travel between his or her parked vehicle and the event forum. The device also provides a more comfortable seat for the user during the event at the event forum than would be provided by the seating of the event forum itself.

The preceding description has been presented only to illustrate and describe embodiments of the invention. It is not intended to be exhaustive or to limit the invention to any precise form disclosed. Many modifications and variations are possible in light of the above teaching.

What is claimed is:

1. An apparatus comprising,
   a wheeled scooter; and
   an event forum seat integrated with the scooter such that said apparatus is operable as either a scooter or a seat for use at an event forum.

2. The apparatus of claim 1, wherein said event forum seat is configured for use on seating already installed at said event forum.

3. The apparatus of claim 2, wherein said seating already installed at said event forum comprises a bench.

4. The apparatus of claim 1, wherein said event forum seat comprises a backrest.

5. The apparatus of claim 1, wherein said event forum seat comprises a seat cushion.

6. The apparatus of claim 1, wherein said apparatus is configured to convert between a first configuration in which said apparatus is operable as a scooter for transportation and a second configuration in which said apparatus is operable as an event forum seat.

7. The apparatus of claim 6, wherein a backrest of said seat in the second configuration also serves as a platform of said scooter on which a user stands when the apparatus is used in the first configuration.

8. The apparatus of claim 6, wherein said apparatus selectively converts into a third configuration for storage, said third configuration being different from said first and second configurations.

9. The apparatus of claim 1, wherein wheels of said scooter are disposed on a carriage on a rear side of said backrest of said event forum seat.

10. The apparatus of claim 1, wherein the scooter comprises a handle that moves between an extended position and a retracted position.

11. The apparatus of claim 10, wherein said handle is attached to a telescopic steering column of said scooter that extends from and collapses into a seat member of said event forum seat.

12. A method of attending an event at an event forum using a device comprising an integrated scooter and event forum seat, said method comprising;
   riding said device to said event forum with said device in a scooter configuration;
   converting said device from said scooter configuration into a seat configuration; and sitting on said device at said event forum with said device being in said seat configuration.

13. The method of claim 12, further comprising:
   converting said device from said seat configuration into said scooter configuration; and
   riding said device in said scooter configuration from said event forum.

14. The method of claim 12, further comprising converting said device to a storage configuration for storage.

15. The method of claim 12, further comprising securing said device to seating already installed at said event forum.

16. The method of claim 15, wherein said seating already installed at said event forum comprises a bench.

17. An apparatus comprising,
   means for providing a wheeled scooter for transportation; and
   means for providing an event forum seat;
   wherein said means for providing a wheeled scooter and integrated with said means for providing an event forum seat.

18. The apparatus of claim 17, wherein said apparatus is configured for use on seating already installed at said event forum.

19. The apparatus of claim 17, wherein said means for providing an event forum seat comprise a backrest.

20. The apparatus of claim 17, wherein said apparatus is configured to convert between a first configuration in which said apparatus is operable as a scooter for transportation and a second configuration in which said apparatus is operable as an event forum seat.

* * * * *